United States Patent
Yan et al.

(10) Patent No.: US 9,461,408 B1
(45) Date of Patent: Oct. 4, 2016

(54) ADAPTOR AND STORAGE DEVICE USING THE SAME

(71) Applicant: Transcend Information, Inc., Taipei (TW)

(72) Inventors: Jhih-Cheng Yan, Keelung (TW); Yuan-Tai Sie, Changhua County (TW); Ssu-Ying Chen, Taipei (TW)

(73) Assignee: Transcend Information, Inc., Taipei (TW)

( * ) Notice: Subject to any disclaimer, the term of this patent is extended or adjusted under 35 U.S.C. 154(b) by 0 days.

(21) Appl. No.: 14/968,857

(22) Filed: Dec. 14, 2015

(51) Int. Cl.
*H01R 13/642* (2006.01)
*H01R 24/60* (2011.01)
*H01R 107/00* (2006.01)

(52) U.S. Cl.
CPC ............ *H01R 13/642* (2013.01); *H01R 24/60* (2013.01); *H01R 2107/00* (2013.01)

(58) Field of Classification Search
USPC ......... 439/217, 638, 676, 81, 660, 655, 218; 174/520
See application file for complete search history.

(56) References Cited

U.S. PATENT DOCUMENTS 8,882,524 B2 * 11/2014 Golko ................. H01R 13/6273 439/218
9,270,067 B2 * 2/2016 Lin ....................... H01R 31/06
2013/0115821 A1 * 5/2013 Golko .................. H01R 13/516 439/638
2013/0244491 A1 * 9/2013 Sarwar .................... H01R 24/60 439/655
2014/0057496 A1 * 2/2014 Siahaan ................ H01R 13/504 439/660
2014/0069709 A1 * 3/2014 Schmidt ............. H01R 13/6581 174/520
2014/0073183 A1 * 3/2014 Golko ................. H01R 13/6594 439/607.34
2014/0206209 A1 * 7/2014 Kamei ................... H01R 24/60 439/81
2014/0329416 A1 * 11/2014 Golko ..................... H01R 29/00 439/676

* cited by examiner

*Primary Examiner* — Alexander Gilman
(74) *Attorney, Agent, or Firm* — CKC & Partners Co., Ltd.

(57) ABSTRACT

An adaptor connects a dual orientation plug connector and a first circuit board. The dual orientation plug connector includes a second circuit board having first to fifth upper contacts sequentially arranged on a surface and having first to fourth lower contacts sequentially arranged on another surface. The first circuit board has first to sixth endpoints. The adaptor includes first to sixth pins. The first to sixth pins respectively include first to sixth contacting portions respectively configured to connect the first upper contact, the first to fourth lower contact, and the fifth upper contact. The first to sixth pins respectively include first to sixth extending portions respectively connecting the first to sixth endpoints. Widths of the third and fourth pins are smaller than widths of the first, second, fifth, and sixth pins.

20 Claims, 7 Drawing Sheets

ADAPTOR AND STORAGE DEVICE USING THE SAME

BACKGROUND

1. Technical Field

The present disclosure relates to an adaptor and a storage device using such adaptor.

2. Description of Related Art

Lightning is a proprietary computer bus and power connector created by Apple Inc. to replace its previous proprietary 30-pin dock connector, and is used to connect Apple mobile devices like iPhones, iPads and iPods to host computers, external monitors, cameras, USB battery chargers and other peripherals. Using eight pins instead of thirty, Lightning is significantly more compact than the 30-pin dock connector and can be inserted with either side facing up. At least C10A Lightning connectors and C68A Lightning connectors have existed in the market. In general, a C68A Lightning connector is cheaper 29% in price and smaller 58% in volume than a C10A Lightning connector, so C68A Lightning connectors have become the mainstream.

SUMMARY

The disclosure provides an adaptor for connecting a dual orientation plug connector and a first circuit board. The dual orientation plug connector includes a second circuit board. The second circuit board has a first upper contact, a second upper contact, a third upper contact, a fourth upper contact, and a fifth upper contact sequentially arranged on a surface of the second circuit board and has a first lower contact, a second lower contact, a third lower contact, and a fourth lower contact sequentially arranged on another surface of the second circuit board. The first circuit board has a first endpoint, a second endpoint, a third endpoint, a fourth endpoint, a fifth endpoint, and a sixth endpoint. The adaptor includes a first pin, a second pin, a third pin, a fourth pin, a fifth pin, a sixth pin, and a fixing block. The first pin includes a first contacting portion, a first extending portion, and a first central portion. The first contacting portion is configured to connect the first upper contact. The first extending portion is connected to the first endpoint. The first central portion is connected between the first contacting portion and the first extending portion. The second pin includes a second contacting portion, a second extending portion, and a second central portion. The second contacting portion is configured to connect the first lower contact. The second extending portion is connected to the second endpoint. The second central portion is connected between the second contacting portion and the second extending portion. The a third pin includes a third contacting portion, a third extending portion, and a third central portion. The third contacting portion is configured to connect the second lower contact. The third extending portion is connected to the third endpoint. The third central portion is connected between the third contacting portion and the third extending portion. The fourth pin includes a fourth contacting portion, a fourth extending portion, and a fourth central portion. The fourth contacting portion is configured to connect the third lower contact. The fourth extending portion is connected to the fourth endpoint. The fourth central portion is connected between the fourth contacting portion and the fourth extending portion. The fifth pin includes a fifth contacting portion, a fifth extending portion, and a fifth central portion. The fifth contacting portion is configured to connect the fourth lower contact. The fifth extending portion is connected to the fifth endpoint. The fifth central portion is connected between the fifth contacting portion and the fifth extending portion. The sixth pin includes a sixth contacting portion, a sixth extending portion, and a sixth central portion. The sixth contacting portion is configured to connect the fifth upper contact. The sixth extending portion is connected to the sixth endpoint. The sixth central portion is connected between the sixth contacting portion and the sixth extending portion. The fixing block fix the first, second, third, fourth, fifth, and sixth central portions. Widths of the third and fourth pins are smaller than widths of the first, second, fifth, and sixth pins.

In an embodiment of the disclosure, the second, third, fourth, and fifth extending portions are coplanar. The first and sixth extending portions are coplanar.

In an embodiment of the disclosure, the first, second, third, fourth, fifth, and sixth extending portions are coplanar.

In an embodiment of the disclosure, the first, second, third, fourth, fifth, and sixth contacting portions substantially extend along a direction.

In an embodiment of the disclosure, the width of any of the first, second, fifth, and sixth pins is in a range from about 0.36 mm to about 0.46 mm.

In an embodiment of the disclosure, the first and second contacting portions extend along different directions, and the fifth and sixth contacting portions extend along different directions.

In an embodiment of the disclosure, the fixing block is an insulating block.

In an embodiment of the disclosure, the dual orientation plug connector is an Apple Lightning connector.

The disclosure further provides a storage device. The storage device includes a first circuit board, a dual orientation plug connector, and an adaptor. The first circuit board has a first endpoint, a second endpoint, a third endpoint, a fourth endpoint, a fifth endpoint, and a sixth endpoint. The dual orientation plug connector includes a second circuit board. The second circuit board has a first upper contact, a second upper contact, a third upper contact, a fourth upper contact, and a fifth upper contact sequentially arranged on a surface of the second circuit board and has a first lower contact, a second lower contact, a third lower contact, and a fourth lower contact sequentially arranged on another surface of the second circuit board. The adaptor includes a first pin, a second pin, a third pin, a fourth pin, a fifth pin, a sixth pin, and a fixing block. The first pin includes a first contacting portion, a first extending portion, and a first central portion. The first contacting portion is configured to connect the first upper contact. The first extending portion is connected to the first endpoint. The first central portion is connected between the first contacting portion and the first extending portion. The second pin includes a second contacting portion, a second extending portion, and a second central portion. The second contacting portion is configured to connect the first lower contact. The second extending portion is connected to the second endpoint. The second central portion is connected between the second contacting portion and the second extending portion. The a third pin includes a third contacting portion, a third extending portion, and a third central portion. The third contacting portion is configured to connect the second lower contact. The third extending portion is connected to the third endpoint. The third central portion is connected between the third contacting portion and the third extending portion. The fourth pin includes a fourth contacting portion, a fourth extending portion, and a fourth central portion. The fourth contacting portion is configured to connect the third lower contact. The fourth extending portion is connected to the fourth endpoint.

The fourth central portion is connected between the fourth contacting portion and the fourth extending portion. The fifth pin includes a fifth contacting portion, a fifth extending portion, and a fifth central portion. The fifth contacting portion is configured to connect the fourth lower contact. The fifth extending portion is connected to the fifth endpoint. The fifth central portion is connected between the fifth contacting portion and the fifth extending portion. The sixth pin includes a sixth contacting portion, a sixth extending portion, and a sixth central portion. The sixth contacting portion is configured to connect the fifth upper contact. The sixth extending portion is connected to the sixth endpoint. The sixth central portion is connected between the sixth contacting portion and the sixth extending portion. The fixing block fix the first, second, third, fourth, fifth, and sixth central portions. Widths of the third and fourth pins are smaller than widths of the first, second, fifth, and sixth pins.

In an embodiment of the disclosure, the first circuit board has opposite surfaces. The second, third, fourth, and fifth extending portions extend on one of the surfaces of the first circuit board, and the first and sixth extending portions extend on the other one of the surfaces of the first circuit board.

In an embodiment of the disclosure, the storage device further includes a holder. The holder envelops at least a part of the second circuit board. The second circuit board is fixed to the holder, and the holder is fixed to the first circuit board.

Accordingly, in the adaptor used in the storage device of the disclosure, the widths of the pins for transmitting power or grounding are greater than the widths of the pins for transmitting signals, so as to provide an optimal design of the adaptor. By appropriately combining the Apple Lightning connector with the adaptor, the storage device is provided with functions of charging, power supplying, and communicating. In addition, the holder enveloping the Apple Lightning connector and fixed to the first circuit board can enhance the whole structural strength of the storage device.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
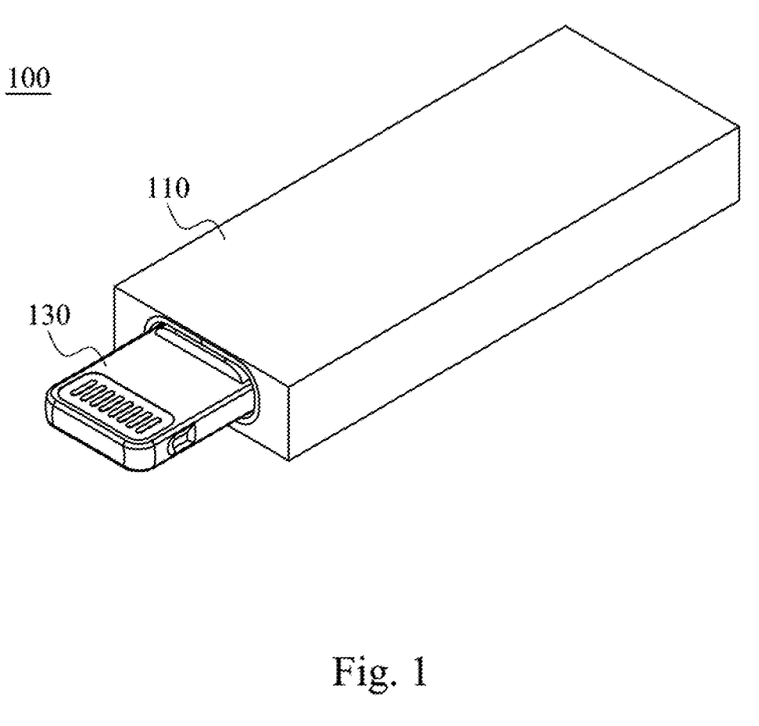
FIG. 1 is a perspective view of a storage device according to some embodiments of the disclosure.
Figure 2A:
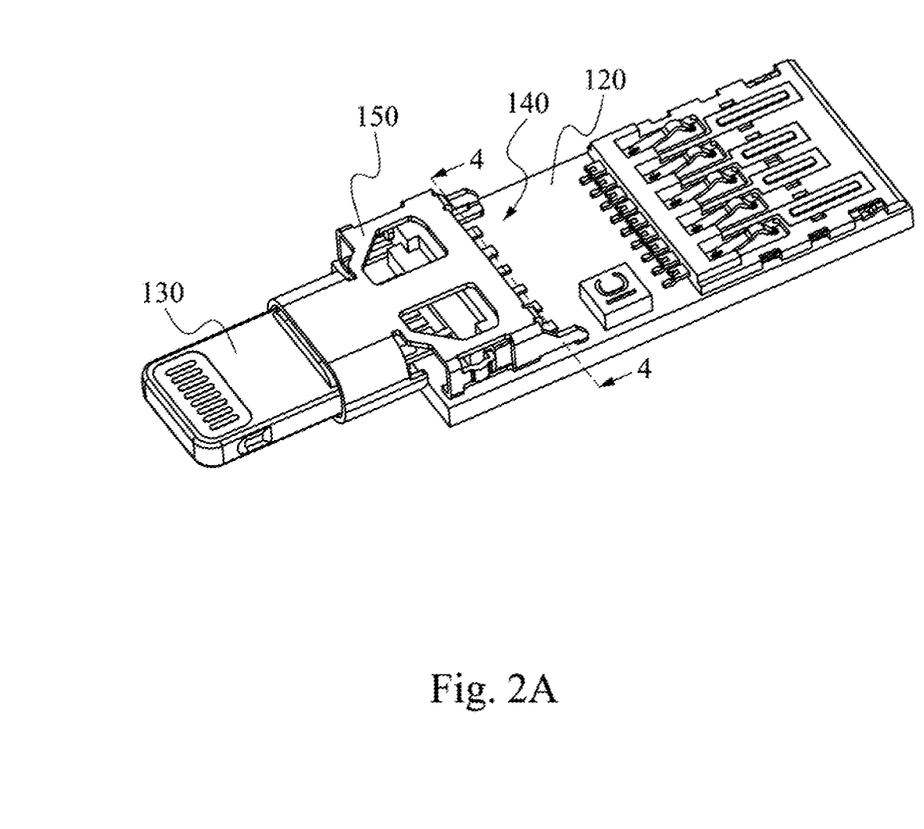
FIG. 2A is a perspective view of the storage device in FIG. 1 according to some embodiments of the disclosure, in which the housing is removed.
Figure 2B:
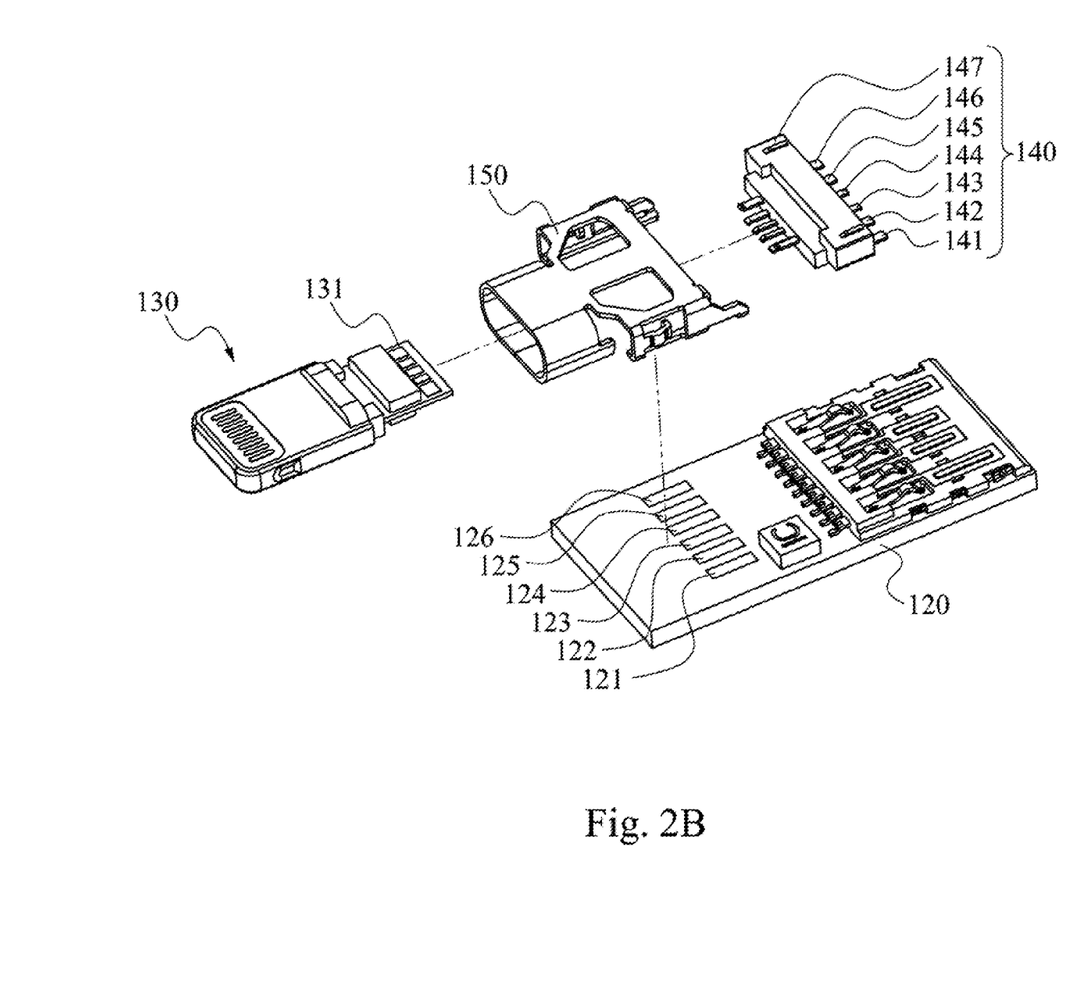
FIG. 2B is an exploded view of the components in FIG. 2A according to some embodiments of the disclosure.
Figure 3A:
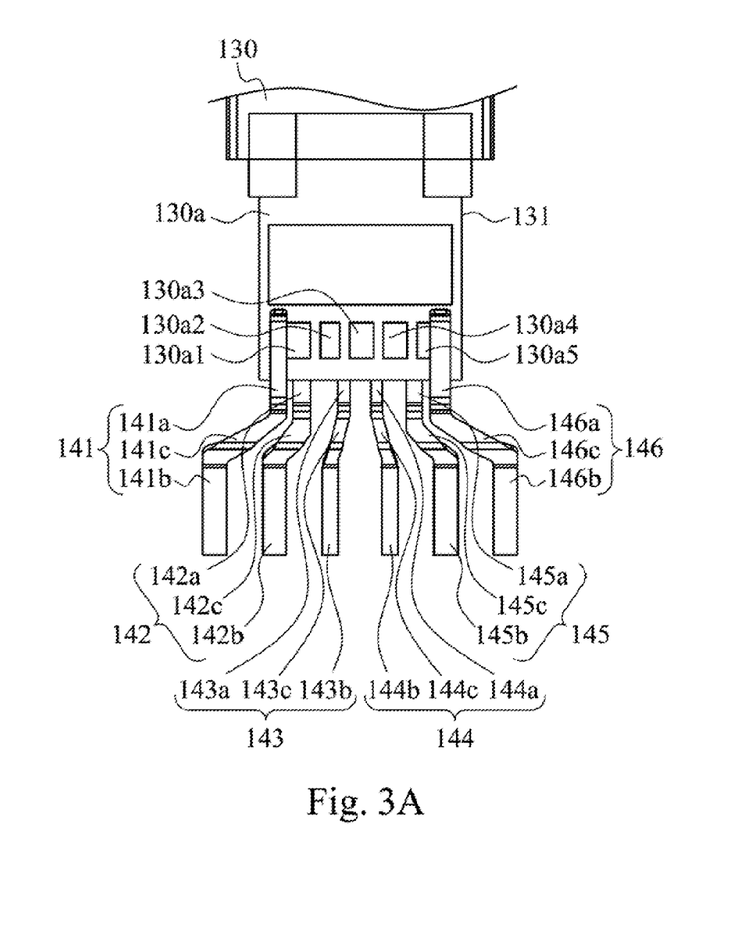
FIG. 3A is a top view of some components in FIG. 2B according to some embodiments of the disclosure.
Figure 3B:
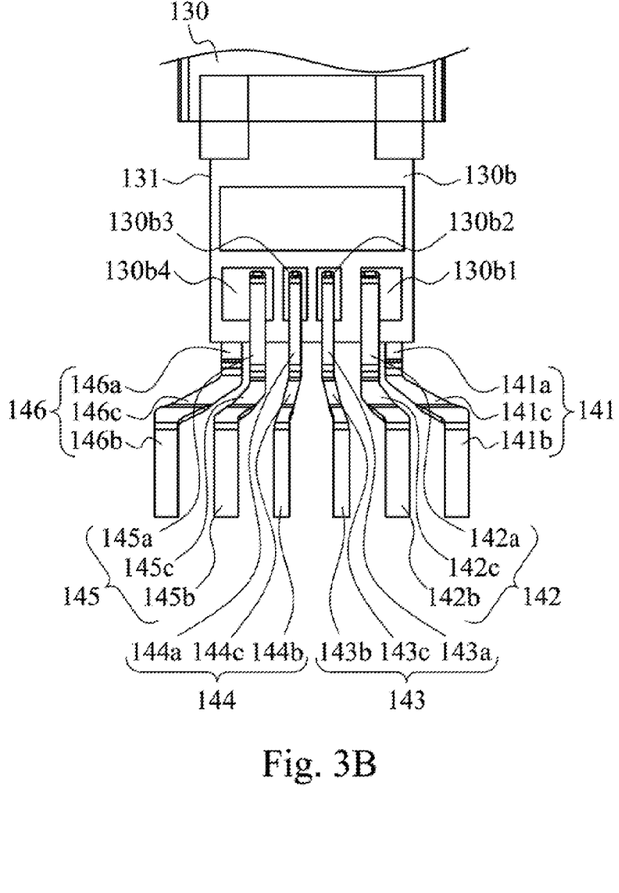
FIG. 3B is a bottom view of some components in FIG. 2B according to some embodiments of the disclosure.

Reference is made to FIG. 1 to FIG. 3B. FIG. 1 is a perspective view of a storage device 100 according to some embodiments of the disclosure. FIG. 2A is a perspective view of the storage device 100 in FIG. 1 according to some embodiments of the disclosure, in which the housing 110 is removed. FIG. 2B is an exploded view of the components in FIG. 2A according to some embodiments of the disclosure. FIG. 3A is a top view of some components in FIG. 2B according to some embodiments of the disclosure. FIG. 3B is a bottom view of some components in FIG. 2B according to some embodiments of the disclosure.

As shown in FIGS. 1 and 2A, the storage device 100 includes a housing 110, first circuit board 120, an Apple Lightning connector 130, and an adaptor 140. The first circuit board 120, a part of the Apple Lightning connector 130, and the adaptor 140 are enveloped in the housing 110. As shown in FIG. 2B, the first circuit board 120 has a first endpoint 121, a second endpoint 122, a third endpoint 123, a fourth endpoint 124, a fifth endpoint 125, and a sixth endpoint 126. As shown in FIGS. 3A and 3B, the Apple Lightning connector 130 includes a second circuit board 131. The second circuit board 131 has a first upper contact 130$a$1, a second upper contact 130$a$2, a third upper contact 130$a$3, a fourth upper contact 130$a$4, and a fifth upper contact 130$a$5 sequentially arranged on a lower surface 130$a$ of the second circuit board 131 and has a first lower contact 130$b$1, a second lower contact 130$b$2, a third lower contact 130$b$3, and a fourth lower contact 130$b$4 sequentially arranged on an upper surface 130$b$ of the second circuit board 131.

In more detailed, according to the protocol standard of the Apple Lightning connector 130 defined by Apple Inc., the first upper contact 130$a$1 of the Apple Lightning connector 130 is configured for transmitting accessory power. The fifth upper contact 130$a$5 of the Apple Lightning connector 130 is configured for grounding. The first lower contact 130$b$1 of the Apple Lightning connector 130 is configured for transmitting device power. The second lower contact 130$b$2 and the third lower contact 130$b$3 of the Apple Lightning connector 130 are configured for transmitting differential pair signals (D+, D−). The fourth lower contact 130$b$4 of the Apple Lightning connector 130 is configured for grounding.

As shown in FIG. 2B to FIG. 3B, the adaptor 140 includes a first pin 141, a second pin 142, a third pin 143, a fourth pin 144, a fifth pin 145, a sixth pin 146, and a fixing block 147. The first pin 141 includes a first contacting portion 141$a$, a first extending portion 141$b$, and a first central portion 141$c$. The first contacting portion 141$a$ is used for connecting the first upper contact 130$a$1. The first extending portion 141$b$ is used for connecting the first endpoint 121. The first central portion 141$c$ is connected between the first contacting portion 141$a$ and the first extending portion 141$b$. The second pin 142 includes a second contacting portion 142$a$, a second extending portion 142$b$, and a second central portion 142$c$. The second contacting portion 142$a$ is used for connecting the first lower contact 130$b$1. The second extending portion 142b is used for connecting to the second endpoint 122. The second central portion 142c is connected between the second contacting portion 142a and the second extending portion 142b. The third pin 143 includes a third contacting portion 143a, a third extending portion 143b, and a third central portion 143c. The third contacting portion 143a is used for connecting the second lower contact 130b2. The third extending portion 143b is used for connecting the third endpoint 123. The third central portion 143c is connected between the third contacting portion 143a and the third extending portion 143b. The fourth pin 144 includes a fourth contacting portion 144a, a fourth extending portion 144b, and a fourth central portion 144c. The fourth contacting portion 144a is used for connecting the third lower contact 130b3. The fourth extending portion 144b is used for connecting the fourth endpoint 124. The fourth central portion 144c is connected between the fourth contacting portion 144a and the fourth extending portion 144b. The fifth pin 145 includes a fifth contacting portion 145a, a fifth extending portion 145b, and a fifth central portion 145c. The fifth contacting portion 145a is used for connecting the fourth lower contact 130b4. The fifth extending portion 145b is used for connecting the fifth endpoint 125. The fifth central portion 145c is connected between the fifth contacting portion 145a and the fifth extending portion 145b. The sixth pin 146 includes a sixth contacting portion 146a, a sixth extending portion 146b, and a sixth central portion 146c. The sixth contacting portion 146a is used for connecting the fifth upper contact 130a5. The sixth extending portion 146b is used for connecting the sixth endpoint 126. The sixth central portion 146c is connected between the sixth contacting portion 146a and the sixth extending portion 146b. The fixing block 147 fix the first central portion 141c, the second central portion 142c, the third central portion 143c, the fourth central portion 144c, the fifth central portion 145c, and the sixth central portion 146c.

Therefore, it can be seen that the first pin 141 is configured for transmitting accessory power. The second pin 142 is configured for transmitting device power. The third pin 143 and the fourth pin 144 are configured for transmitting differential pair signals (D+, D−). The fifth pin 145 and the sixth pin 146 are configured for grounding. As a result, the storage device 100 combining the Apple Lightning connector 130 with the adaptor 140 is provided with functions of charging, power supplying, and communicating.

In some embodiments, because the first pin 141 and the second pin 142 are configured for transmitting power and the fifth pin 145 and the sixth pin 146 are configured for grounding, for considering an optimal design of the adaptor 140, widths of the third pin 143 and fourth pin 144 can be smaller than widths of the first pin 141, the second pin 142, the fifth pin 145, and the sixth pin 146. In other words, the widths of the pins for transmitting power (i.e., the first pin 141 and the second pin 142) and/or grounding (i.e., the fifth pin 145 and the sixth pin 146) can be greater than the widths of the pins for transmitting signals (i.e., the third pin 143 and the fourth pin 144).

Figure 4:
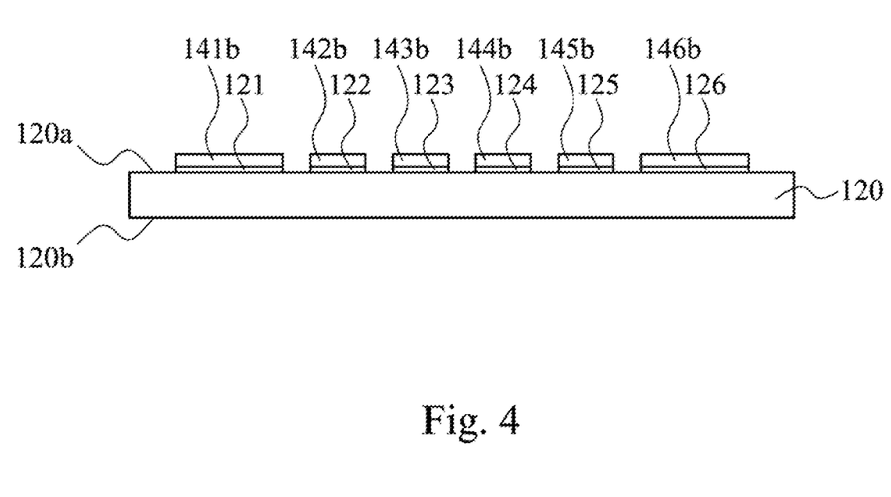
FIG. 4 is a cross-sectional view of the components taken along line 4-4 in FIG. 2A according to some embodiments of the disclosure.

Reference is made to FIG. 4. FIG. 4 is a cross-sectional view of the components taken along line 4-4 in FIG. 2A according to some embodiments of the disclosure.

As shown in FIG. 3A to FIG. 4, the first contacting portion 141a, the second contacting portion 142a, the third contacting portion 143a, the fourth contacting portion 144a, the fifth contacting portion 145a, and the sixth contacting portion 146a substantially extend along a direction. The first circuit board 120 has an upper surface 120a and a lower surface 120b opposite to each other. The first extending portion 141b, the second extending portion 142b, the third extending portion 143b, the fourth extending portion 144b, the fifth extending portion 145b, and the sixth extending portion 146b are coplanar and extend on the upper surface 120a of the first circuit board 120. In general, widths of the first upper contact 130a1, the second upper contact 130a2, the third upper contact 130a3, the fourth upper contact 130a4, the fifth upper contact 130a5, the first lower contact 130b1, the second lower contact 130b2, the third lower contact 130b3, and the fourth lower contact 130b4 of the Apple Lightning connector 130 are in a range from about 0.6 mm to about 1.23 mm. In order to meet the above width limitation under the structural configuration, the width of any of the first pin 141, the second pin 142, the fifth pin 145, and the sixth pin 146 is in a range from about 0.36 mm to about 0.5 mm, and no structural interference will occur between the first pin 141 and the second pin 142 or between the fifth pin 145 and the sixth pin 146.

In some embodiments, the fixing block 147 is an insulating block, so as to isolate the first pin 141, the second pin 142, the third pin 143, the fourth pin 144, the fifth pin 145, and the sixth pin 146 from each other.

In some embodiments, the storage device 100 is a flash drive, but the disclosure is not limited in this regard.

Figure 5:
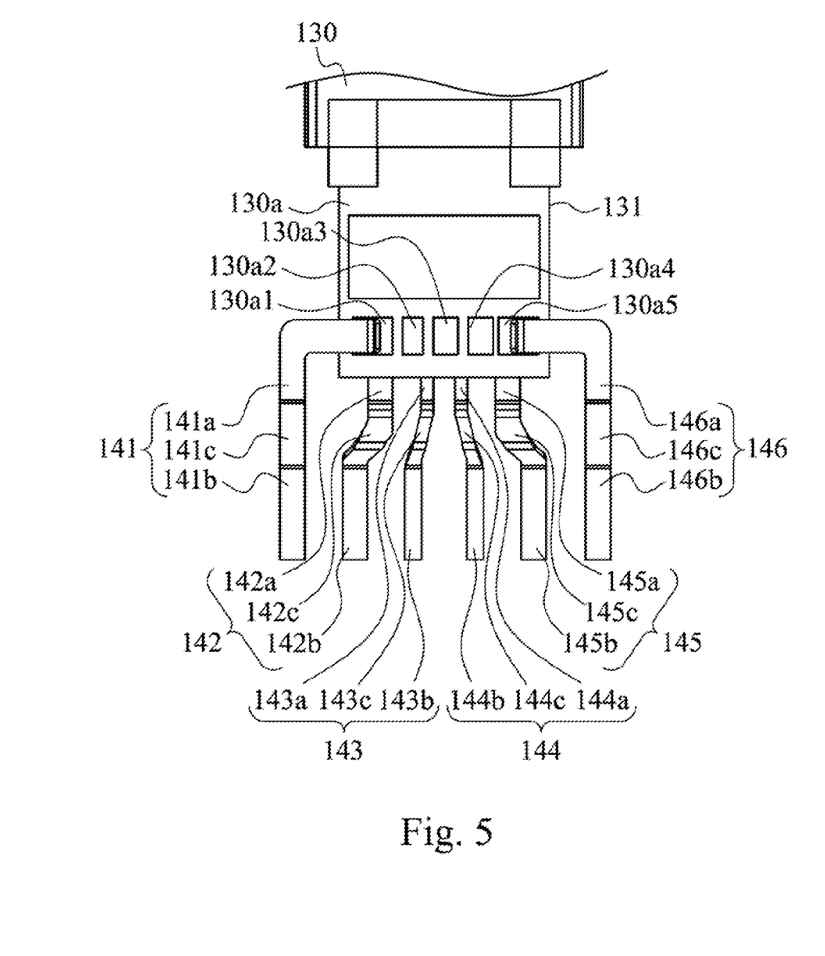
FIG. 5 is a bottom view of some components in FIG. 2B according to some other embodiments of the disclosure.

Reference is made to FIG. 5. FIG. 5 is a bottom view of some components in FIG. 2B according to some other embodiments of the disclosure.

As shown in FIG. 5, the first contacting portion 141a and the second contacting portion 142a extend along different directions. The fifth contacting portion 145a and the sixth contacting portion 146a extend along different directions. Specifically, the first contacting portion 141a extends away from the second upper contact 130a2, and the sixth contacting portion 146a extends away from the fourth upper contact 130a4, so it is more unlikely to cause a structural interference between the first pin 141 and the second pin 142 or between the fifth pin 145 and the sixth pin 146, and the widths of the first pin 141, the second pin 142, the fifth pin 145, and the sixth pin 146 can be increased as possible, which is beneficial to transmitting power and grounding.

Other details regarding the components of FIG. 5 are similar to the components of FIG. 3A and therefore are not repeated here to avoid duplicity.

Figure 6:
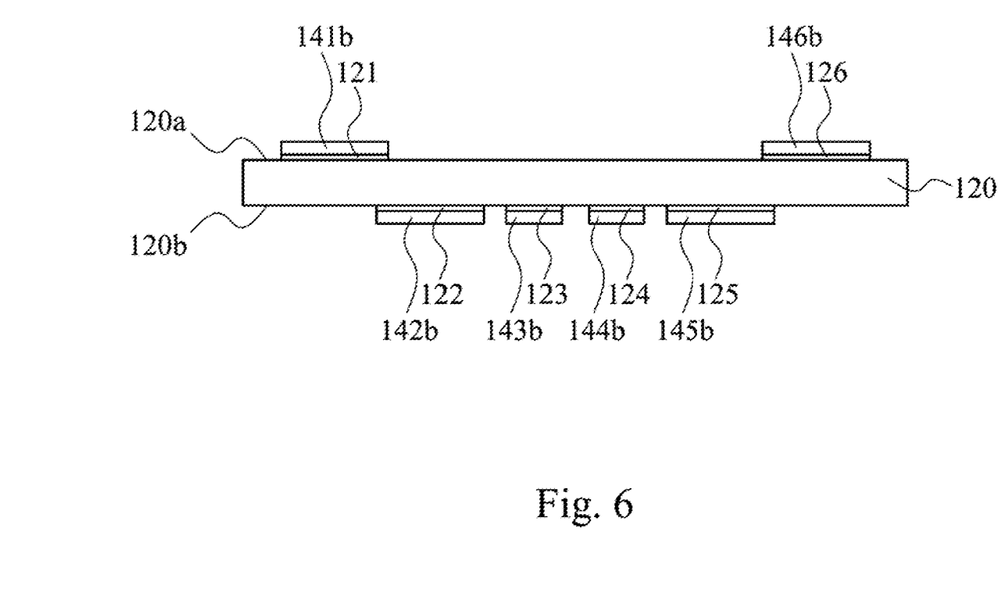
FIG. 6 is a cross-sectional view of the components taken along line 4-4 in FIG. 2A according to some other embodiments of the disclosure.

Reference is made to FIG. 6. FIG. 6 is a cross-sectional view of the components taken along line 4-4 in FIG. 2A according to some other embodiments of the disclosure.

As shown in FIG. 6, the second extending portion 142b, the third extending portion 143b, the fourth extending portion 144b, and the fifth extending portion 145b extend on the lower surface 120b of the first circuit board 120, and the first extending portion 141b and the sixth extending portion 146b extend on the upper surface 120a of the first circuit board 120, so it is more unlikely to cause a structural interference between the first pin 141 and the second pin 142 or between the fifth pin 145 and the sixth pin 146, and the widths of the first pin 141, the second pin 142, the fifth pin 145, and the sixth pin 146 can be increased as possible, which is beneficial to transmitting power and grounding.

As shown in FIGS. 2A and 2B, the storage device 100 further includes a holder 150. The holder 150 envelops at least a part of the second circuit board 131. The second circuit board 131 is fixed to the holder 150, and the holder 150 is fixed to the first circuit board 120. In some embodiments, the Apple Lightning connector 130 having the second circuit board 131 enveloped by the holder 150 is a C68A Apple Lightning connector 130.

In some embodiments, the holder 150 is fixed to the first circuit board 120 by using SMT (Surface Mount Technology) or by manual welding, but the disclosure is not limited in this regard.

In some embodiments, the holder 150 is made of stainless steel, but the disclosure is not limited in this regard.

According to the foregoing recitations of the embodiments of the disclosure, it can be seen that in the adaptor used in the storage device, the widths of the pins for transmitting power or grounding are greater than the widths of the pins for transmitting signals, so as to provide an optimal design of the adaptor. By appropriately combining the Apple Lightning connector with the adaptor, the storage device is provided with functions of charging, power supplying, and communicating. In addition, the holder enveloping the Apple Lightning connector and fixed to the first circuit board can enhance the whole structural strength of the storage device.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An adaptor for connecting a dual orientation plug connector and a first circuit board, the dual orientation plug connector comprising a second circuit board having a first upper contact, a second upper contact, a third upper contact, a fourth upper contact, and a fifth upper contact sequentially arranged on a surface of the second circuit board and having a first lower contact, a second lower contact, a third lower contact, and a fourth lower contact sequentially arranged on another surface of the second circuit board, the first circuit board having a first endpoint, a second endpoint, a third endpoint, a fourth endpoint, a fifth endpoint, and a sixth endpoint, the adaptor comprising:
   a first pin comprising a first contacting portion configured to connect the first upper contact, a first extending portion connected to the first endpoint, and a first central portion connected between the first contacting portion and the first extending portion;
   a second pin comprising a second contacting portion configured to connect the first lower contact, a second extending portion connected to the second endpoint, and a second central portion connected between the second contacting portion and the second extending portion;
   a third pin comprising a third contacting portion configured to connect the second lower contact, a third extending portion connected to the third endpoint, and a third central portion connected between the third contacting portion and the third extending portion;
   a fourth pin comprising a fourth contacting portion configured to connect the third lower contact, a fourth extending portion connected to the fourth endpoint, and a fourth central portion connected between the fourth contacting portion and the fourth extending portion;
   a fifth pin comprising a fifth contacting portion configured to connect the fourth lower contact, a fifth extending portion connected to the fifth endpoint, and a fifth central portion connected between the fifth contacting portion and the fifth extending portion;
   a sixth pin comprising a sixth contacting portion configured to connect the fifth upper contact, a sixth extending portion connected to the sixth endpoint, and a sixth central portion connected between the sixth contacting portion and the sixth extending portion; and
   a fixing block fix the first, second, third, fourth, fifth, and sixth central portions;
   wherein widths of the third and fourth pins are smaller than widths of the first, second, fifth, and sixth pins.

2. The adaptor of claim 1, wherein the second, third, fourth, and fifth extending portions are coplanar, and the first and sixth extending portions are coplanar.

3. The adaptor of claim 2, wherein the first, second, third, fourth, fifth, and sixth extending portions are coplanar.

4. The adaptor of claim 1, wherein the first, second, third, fourth, fifth, and sixth contacting portions substantially extend along a direction.

5. The adaptor of claim 4, wherein the width of any of the first, second, fifth, and sixth pins is in a range from about 0.36 mm to about 0.5 mm.

6. The adaptor of claim 1, wherein the first and second contacting portions extend along different directions, and the fifth and sixth contacting portions extend along different directions.

7. The adaptor of claim 1, wherein the fixing block is an insulating block.

8. The adaptor of claim 1, wherein the dual orientation plug connector is an Apple Lightning connector.

9. The adaptor of claim 1, wherein the first pin is configured for transmitting accessory power, the second pin is configured for transmitting device power, the third pin and the fourth pin are configured for transmitting differential pair signals, and the fifth pin and the sixth pin are configured for grounding.

10. A storage device, comprising:
   a first circuit board having a first endpoint, a second endpoint, a third endpoint, a fourth endpoint, a fifth endpoint, and a sixth endpoint;
   a dual orientation plug connector comprising a second circuit board having a first upper contact, a second upper contact, a third upper contact, a fourth upper contact, and a fifth upper contact sequentially arranged on a surface of the second circuit board and having a first lower contact, a second lower contact, a third lower contact, and a fourth lower contact sequentially arranged on another surface of the second circuit board; and
   an adaptor comprising:
      a first pin comprising a first contacting portion configured to connect the first upper contact, a first extending portion connected to the first endpoint, and a first central portion connected between the first contacting portion and the first extending portion;
      a second pin comprising a second contacting portion configured to connect the first lower contact, a second extending portion connected to the second endpoint, and a second central portion connected between the second contacting portion and the second extending portion;
      a third pin comprising a third contacting portion configured to connect the second lower contact, a third extending portion connected to the third endpoint, and a third central portion connected between the third contacting portion and the third extending portion;

a fourth pin comprising a fourth contacting portion configured to connect the third lower contact, a fourth extending portion connected to the fourth endpoint, and a fourth central portion connected between the fourth contacting portion and the fourth extending portion;

a fifth pin comprising a fifth contacting portion configured to connect the fourth lower contact, a fifth extending portion connected to the fifth endpoint, and a fifth central portion connected between the fifth contacting portion and the fifth extending portion;

a sixth pin comprising a sixth contacting portion configured to connect the fifth upper contact, a sixth extending portion connected to the sixth endpoint, and a sixth central portion connected between the sixth contacting portion and the sixth extending portion; and a fixing block fix the first, second, third, fourth, fifth, and sixth central portions;

wherein widths of the third and fourth pins are smaller than widths of the first, second, fifth, and sixth pins.

11. The storage device of claim 10, wherein the second, third, fourth, and fifth extending portions are coplanar, and the first and sixth extending portions are coplanar.

12. The storage device of claim 11, wherein the first circuit board has opposite surfaces, the second, third, fourth, and fifth extending portions extend on one of the surfaces of the first circuit board, and the first and sixth extending portions extend on the other one of the surfaces of the first circuit board.

13. The storage device of claim 11, wherein the first, second, third, fourth, fifth, and sixth extending portions are coplanar.

14. The storage device of claim 10, wherein the first, second, third, fourth, fifth, and sixth contacting portions substantially extend along a direction.

15. The storage device of claim 14, wherein the width of any of the first, second, fifth, and sixth pins is in a range from about 0.36 mm to about 0.5 mm.

16. The storage device of claim 10, wherein the first and second contacting portions extend along different directions, and the fifth and sixth contacting portions extend along different directions.

17. The storage device of claim 10, further comprising a holder enveloping at least a part of the second circuit board, wherein the second circuit board is fixed to the holder, and the holder is fixed to the first circuit board.

18. The storage device of claim 10, wherein the fixing block is an insulating block.

19. The storage device of claim 10, wherein the dual orientation plug connector is an Apple Lightning connector.

20. The storage device of claim 10, wherein the first pin is configured for transmitting accessory power, the second pin is configured for transmitting device power, the third pin and the fourth pin are configured for transmitting differential pair signals, and the fifth pin and the sixth pin are configured for grounding.

* * * * *